Sept. 25, 1928.
H. R. WEST
1,685,656
INDUCTION VOLTAGE REGULATOR
Filed May 25, 1927
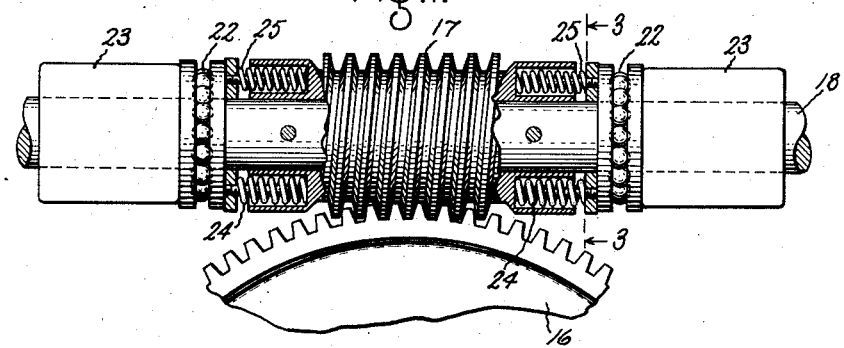
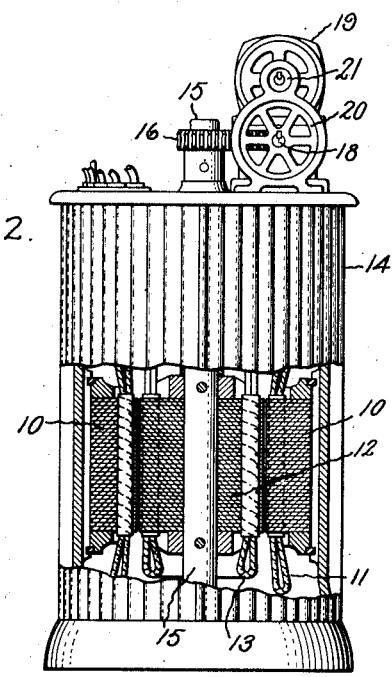
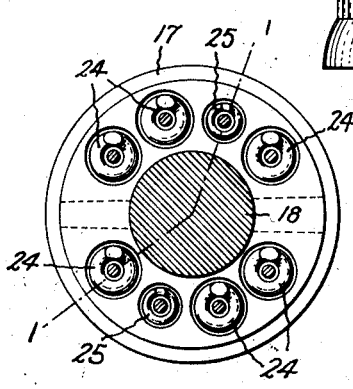
Inventor:
Harry R. West
by
His Attorney.

Patented Sept. 25, 1928.

1,685,656

UNITED STATES PATENT OFFICE.

HARRY R. WEST, OF PITTSFIELD, MASSACHUSETTS, ASSIGNOR TO GENERAL ELECTRIC COMPANY, A CORPORATION OF NEW YORK.

INDUCTION VOLTAGE REGULATOR.

Application filed May 25, 1927. Serial No. 194,173.

My invention relates to induction voltage regulators. The usual type of induction votage regulator includes a stator and a rotor. The stator is a stationary hollow cylindrical core with a winding held in slots or grooves in its inner surface. This stator surrounds the rotor which is a cylindrical magnetic core with a winding held in slots or grooves in its outer surface. One of the windings, usually the rotor winding, is connected across the circuit in which the voltage is to be regulated and the other winding is connected in series with one side of that circuit. The rotor is mounted on a rotatable shaft and means are provided which act through the shaft to adjust the position of the rotor with respect to the stator so that the current in the primary or rotor winding will induce the proper voltage in the secondary or stator winding to raise or lower the voltage of the circuit to the desired value.

The force or torque applied to the rotor by the adjusting means to maintain the rotor in the desired position with respect to the stator is opposed by a magnetic force or torque between the rotor and stator. This magnetic torque varies with the position of the rotor and with the load on the regulator and may be of considerable magnitude, particularly in the case of a regulator of large capacity and under heavy load. The currents in the windings are, of course, always alternating currents so that the magnetic torque between the rotor and stator is vibratory in character and causes the rotor to vibrate with a frequency equal to twice that of the currents in the windings. It has been found that this vibration of the rotor may be transmitted through the rotor shaft and the rotor adjusting means and cause the regulator to be objectionably noisy. The general object of the invention is to provide an improved construction and arrangement of parts for adjusting the position of the rotor with respect to the stator whereby this noise is greatly reduced.

The invention will be better understood from the following description taken in connection with the accompanying drawing in which Fig. 1 is a detail view, partly in section, of one form of rotor adjusting means constructed in accordance with the invention; Fig. 2 is a view of an induction voltage regulator with its casing partly broken away; and Fig. 3 is an enlarged sectional view on the line 3—3 of Fig. 1 looking in the direction of the arrows.

Like reference characters indicate similar parts in the different views of the drawing.

The particular regulator shown in Fig. 2 includes the usual form of stator and rotor. The stator comprises a hollow cylindrical magnetic core 10 with a winding 11 held in slots in its inner surface. The stator surrounds the rotor which comprises a cylindrical magnetic core 12 with a winding 13 held in slots in its outer surface. The rotor winding 13 is usually the primary winding, being connected between the two sides of the circuit in which the voltage is to be regulated. The stator winding 11 is then the secondary winding, being connected in series with one side of that circuit. Both rotor and stator may be immersed in a body of insulating oil in a casing 14. The rotor is mounted on a rotatable shaft 15 so that its position with respect to the stator may be adjusted to regulate the voltage induced in the stator winding and thus to raise or lower the voltage of the circuit to which the regulator is connected.

The adjustment of the position of the rotor is accomplished by a gear segment 16 which is driven by a worm 17 on a shaft 18. The shaft 18 may be driven by any suitable means such as the motor 19 to which it is connected by a gear 20 and pinion 21. The driving worm 17 is confined longitudinally by a ball bearing 22 at each end, each of these bearings 22 being seated against a rigid support 23. Between each bearing 22 and the adjacent end of the worm 17 are interposed a plurality of springs so that the endwise thrust of the worm 17 is resiliently opposed by the springs. Each set of springs preferably includes both strong heavy springs 24 and lighter weaker springs 25. The springs of each set should be disposed symmetrically about the axis of the worm to distribute the pressure properly on the worm. The heavy springs 24 are stiff enough to provide a resilient cushion between each end of the worm 17 and its adjacent support 23 under all conditions and even when the torque of the rotor is at its maximum value in either direction. These springs 24 absorb vibrations of the rotor and prevent or reduce transmission of these vibrations to the fixed supports 23 which are usually rigidly connected to the casing 14 and to the stator and its supports. This elimination or reduction of vibration in the casing and in the supports for the moving parts is conducive to quietness of the regulator. The worm 17 is shown as being rigidly secured to the shaft 18 so that any vibration of the rotor will be transmitted through the gear segment 16 and worm 17 to this shaft 18. Such vibration of the shaft 18 cannot be transmitted beyond the gear 20, however, if the shaft 18 has a small amount of free endwise movement to take up this vibration.

It is preferable, however, that the pressure of the springs 24 be not greater than is necessary because as the pressure increases the ability of the springs to transmit vibration will also increase. Therefore, the springs 24 are preferably arranged so that they will be under little or no compression when there is no magnetic torque between the stator and rotor. The parts are also more easily assembled with these heavy springs under little or no compression.

When the conditions are such that the worm 17 is exerting a force through the gear segment 16 to displace the rotor against a magnetic torque between the rotor and stator, the springs 24 at one end of the worm will be under compression while those at the other end of the worm will be loose. The springs 25 which are light and weak as compared with the springs 24 are therefore interposed between each end of the worm 17 and the adjacent bearing 22. These springs 25 are arranged to be always under compression so as to press against the bearings and prevent noise and chattering in the bearings and between the worm and the gear segment 16 even when the bearings are relieved from the pressure of the heavy springs 24.

The invention has been explained by describing what is now considered the best form thereof but it will be apparent that various changes may be made within the scope of the invention as defined by the appended claims.

What I claim as new and desire to secure by Letters Patent of the United States, is:

1. An induction voltage regulator including a rotor and a stator, means for adjusting the position of the rotor with respect to the stator, a support for said adjusting means, and resilient means for reducing transmission of vibration from the rotor through said adjusting means to said support, said resilient means including one set of springs to cushion the force between said adjusting means and said rotor and a second set of springs weaker than said first set to exert pressure on said adjusting means when said first set of springs is relieved of compression.

2. An induction voltage regulator including a rotor and a stator, a worm and gear for adjusting the position of the rotor with respect to the stator, a support for each end of said worm, and springs interposed between each end of the worm and its support to prevent transmission of vibration from said rotor through said worm to said supports.

3. An induction voltage regulator including a rotor and a stator, a worm and gear for adjusting the position of the rotor with respect to the stator, a support for each end of said worm, heavy springs interposed between each end of said worm and its support to provide resilient cushions for said worm, and lighter springs also interposed between each end of said worm and its support to exert pressure between said worm and supports when said heavy springs are relieved of compression.

4. An induction voltage regulator including a rotor and a stator, a worm and gear for adjusting the position of the rotor with respect to the stator, a bearing for each end of said worm, a support for each bearing, heavy springs interposed between each end of said worm and its bearing to provide resilient cushions for said worm, and lighter springs also interposed between each end of said worm and its bearing to exert pressure between said worm and bearings when said heavy springs are relieved of compression.

In witness whereof, I have hereunto set my hand this 23 day of May, 1927.

HARRY R. WEST.